United States Patent Office 3,483,559
Patented Dec. 9, 1969

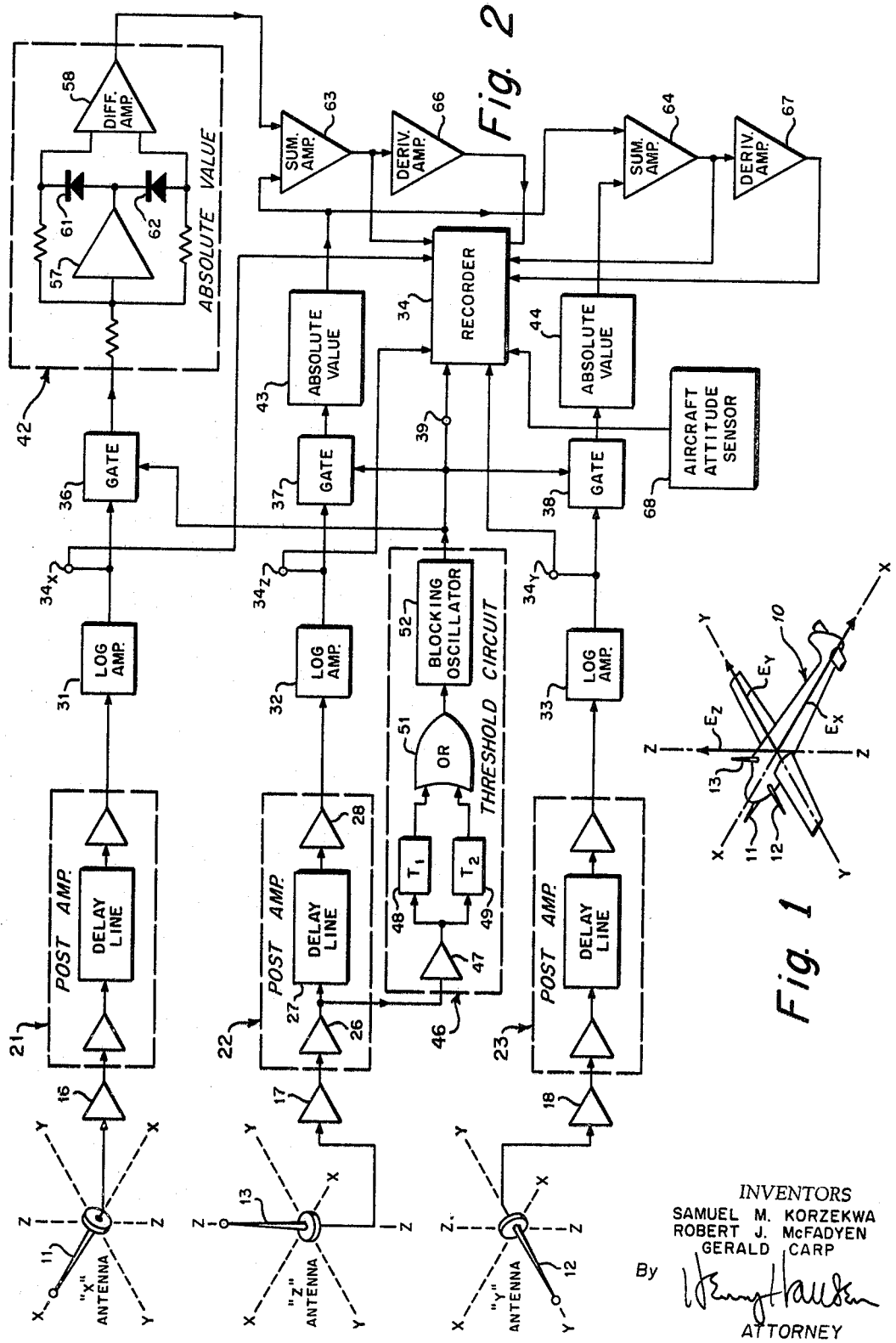

3,483,559
EMP RECEIVER AND PROCESSOR
Samuel M. Korzekwa, Baldwinsville, and Robert J. McFadyen, Syracuse, N.Y., and Gerald Carp, Potomac, Md., assignors, by mesne assignments, to the United States of America as represented by the Secretary of the Navy
Filed May 23, 1968, Ser. No. 731,543
Int. Cl. H04b 7/00
U.S. Cl. 343—100                              10 Claims

ABSTRACT OF THE DISCLOSURE

Apparatus for measuring the time history of critical characteristics of the three orthogonal field components of an electromagnetic pulse (EMP) produced by a nuclear detonation. The received signals are fed into three separate channels where they are logarithmically compressed, transformed into absolute values, and the ratios of selected absolute values and their derivatives are obtained. The logarithmic ratio, and ratio derivative signals are each recorded with signals indicative of aircraft attitude. A threshold circuit initiates recording of the received signals only when one of the field components exceeds a predetermined level. To insure that the initial portion of each signal is recorded even though the threshold level does not occur at the beginning of the signal, delay lines are included in each channel.

---

The invention described herein may be manufactured and used by or for the Government of the United States of America for governmental purposes without the payment of any royalties thereon or therefor.

Background of the invention

The present invention relates to apparatus for measuring electromagnetic radiation, and more particularly to an airborne instrument which receives the electromagnetic pulse (EMP) from a nuclear detonation and processes signals generated thereby for recordation and analysis.

One technical approach in the development of devices for protection of aircraft pilots against flashblindness caused by the very intense light from nuclear detonations utilizes a sensor responsive to electromagnetic radiation and light which triggers the pilot's goggles to become opaque almost instantaneously. Triggering occurs upon coincident receipt of both light and electromagnetic radiation. However, to ensure that the sensor will discriminate against false signals, such as sferics, and will function properly for all aircraft attitudes, an analysis of certain characteristics of the EMP, at known aircraft attitudes, propagated by nuclear detonations is necessary in order to determine what are recurring features suitable for recognition as a "signature." Presently there are at least three features measurable at the aircraft which are considered pertinent: (1) the time correlation of the EMP and the optical energy, (2) the amplitude history of the EMP, and (3) the polarization history of the EMP.

Conventional instrumentation and techniques for measuring and processing electromagnetic radiation are incapable of receiving the EMP from a nuclear detonation and processing the signals generated thereby for the aforementioned feature analysis.

Summary of the invention

Accordingly, it is the general purpose of the present invention to provide instrumentation which will receive and process only the critical features of an EMP which will permit meaningful recordation suitable for analysis of the EMP released by a nuclear detonation and received aboard an aircraft at flashblindness ranges.

This is accomplished by sensing the orthogonal components of the electromagnetic field with three linearly polarized antennas mounted respectively along the longitudinal, lateral and vertical axes of the aircraft. The received signals are each logarithmically compressed, transformed into the absolute values, the ratios of selected absolute values obtained, and finally the derivative of each ratio obtained. The logarithmic signals, the absolute value ratios, and the ratio derivatives are each recorded with aircraft attitude. A threshold circuit initiates recording of the received signals only when one of the field components exceeds a predetermined level. To insure that the initial portion of each signal is recorded even though the threshold level does not occur at the beginning of the signal, delay lines are included in each signal processing circuit.

Brief description of the drawing

In the drawing:
FIG. 1 is a pictorial representation of antennas mounted on aircraft according to the invention; and
FIG. 2 is a schematic-block diagram of one embodiment according to the invention for processing the signals received by the antennas of FIG. 1.

Description of the preferred embodiment

Referring now to FIG. 1 of the drawing, an aircraft 10 is shown having three orthogonal linearly polarized monopole or probe antennas 11, 12 and 13. Antenna 11 is mounted on the nose of the fuselage and extends parallel to the aircraft longitudinal axis X—X, antenna 12 is mounted on the side of the aircraft and extends parallel to the aircraft lateral axis Y—Y, and antenna 13 is mounted on the fuselage and extends parallel to the aircraft vertical axis Z—Z. The antennas 11, 12 and 13 sense the electromagnetic field components $E_x$, $E_y$ and $E_z$ parallel to the X—X, Y—Y and Z—Z axes, respectively. Transco Model 1180 antennas have proven suitable for this purpose since they are designed for mounting directly on the skin of aircraft traveling at less than Mach 1, and, when used with the ground plane, have an antenna capacitance of 6.5 pf.

As shown in FIG. 2, the signals $E_x$, $E_z$ and $E_y$ received by antennas 11, 13 and 12 are first passed through preamplifiers 16, 17 and 18 in channels X, Z and Y, respectively, which serve to match the impedance of the antennas and raise the signal levels so that the effects of weakened signals into subsequent portions of the instrumentation will be insignificant.

From the preamplifiers, the signals are fed to post amplifiers 21, 22 and 23 in channels X, Z and Y, respectively. Except as noted hereinbelow, the post amplifiers are identical to each other, therefore only post amplifier 22 will be described. The post amplifier 22 comprises a shunt feedback doublet or amplifier 26 which drives a delay line 27, which in turn feeds another shunt feedback doublet or amplifier 28. The doublets 26 and 28 provide input and output impedance matches for the delay line 27 and an overall gain in signal level. The delay line 27 delays the signal for a predetermined time before being passed to the output of the post amplifier 22. In the illustrated embodiment, a five microsecond delay was selected which exceeds the maximum anticipated duration of a signal which will reach the threshold level required to initiate recordation.

The output signals from post amplifiers 21, 22 and 23 are fed to bipolar logarithmic amplifiers 31, 32 and 33, each serving two distinct purposes. Firstly, they permit resolution of the three orthogonal field components over a wide dynamic range using conventional linear recorders with limited dynamic range, and, secondly, they provide the logarithmic functions required for subsequent data processing. One such amplifier is disclosed in U.S. patent application Ser. No. 423,679, filed Jan. 6, 1965 for "Compensated Operational Amplifier" by R. J. McFadyen et al., now U.S. Patent No. 3,392,287. The output signals log $E_x$, log $E_z$ and log $E_y$ of the amplifiers 31, 32, and 33 are each connected at terminals $34_x$, $34_z$, $34_y$ to a recorder 34 for visual display, and also to transmission gates 36, 37 and 38.

The gates 36, 37 and 38 are enabled to pass the logarithmic output signals to absolute value circuits 42, 43 and 44 when a threshold level is reached by the signal sensed by antenna 13. This is accomplished with a threshold circuit 46 which takes it input from the output of the doublet 26 in the post amplifier 22 prior to the five microsecond delay. This insures processing and recording of the initial portions of the signal. The threshold circuit 46 includes a buffer amplifier 47 which feeds to two parallel-connected threshold triggers 48 and 49, one for positive and one for negative signals. The threshold triggers 48 and 49 may be of any conventional circuit configuration whereby a positive output signal appears at trigger 48 when a negative input signal of a threshold level is fed to trigger 48 and at trigger 49 when the same threshold level but of opposite polarity is fed to trigger 49. The trigger outputs are fed to the two input terminals of an OR gate 51. When a positive signal appears at either input to OR gate 51, the output thereof operates a blocking oscillator 52 to produce a short rise time signal of duration at least as great as the received transient signal at output terminal 39 thereof for enabling gates 36, 37 and 38, for providing a time reference mark on the recorder 34, and for triggering oscilloscopes and other electronic components, not shown.

With gates 36, 37 and 38 enabled, the delayed bipolar signals from logarithmic amplifiers 31, 32 and 33 pass through the absolute value circuits 42, 43 and 44 where a unipolar signal is produced at the output thereof. The circuits 42, 43 and 44 are substantially identical, hence only circuit 42 will be described herein with more detail. The circuit 42 includes two amplifying sections. The output from the enabling gate 36 circuit passes through an ideal diode amplifier 57 which in turn has its output connected through two oppositely poled ideal diodes to the two inputs of a differential amplifier 58 so that the output thereof is a "full wave" rectified signal. The absolute value output signal may be made either positive or negative by selecting the appropriate ideal diode/differential amplifier interconnections. In the disclosed embodiment, the circuits 42 and 44 (X and Y channels) are connected to provide positive absolute value signals, and the circuit 43 (Z channel) is connected to provide a negative absolute value signal.

When the signals are summed the ratio is then formed. That is, $$\log|E_x| - \log|E_z| = \log\left|\frac{E_x}{E_z}\right|$$

and $$\log|E_y| - \log|E_z| = \log\left|\frac{E_y}{E_z}\right|$$

These logarithmic ratios are indicative of the electromagnetic field E polarization in the X–Z and Y–Z planes as identified by the aircraft 10 axes and shown in FIG. 1. To accomplish this, the outputs of the absolute value circuits 42 and 43 are combined in a summing amplifier 63. Similarly the outputs from absolute value circuits 43 and 44 are combined in a summing amplifier 64.

From the summing amplifiers 63 and 64, the logarithmic ratios are passed through derivative amplifiers 66 and 67 which take the first time derivative of the logarithmic ratios. That is, $$\frac{d}{dt}\log\left|\frac{E_x}{E_z}\right| \text{ and } \frac{d}{dt}\log\left|\frac{E_y}{E_z}\right|$$

These values serve to emphasize the fluctuations in the field polarization.

The outputs of both the summing amplifiers and the derivative amplifiers are each connected to separate inputs of recorder 34.

In addition to the aforementioned E field characteristics, recorder 34 also records signals indicative of aircraft pitch, roll and yaw as measured by an attitude sensor 68.

Some of the many advantages and improvements over the prior art should now be readily apparent. The above described system provides significant improvements over prior art attempts to process signals in order that they be readily recorded. For example, only critical processed signal characteristics are recorded thereby eliminating error multiplication in subsequent data reduction phases; meaningful recording of critical signal characteristics, heretofore not recordable, is now possible; and less stringent requirements are imposed on the recording equipment thereby realizing a significant economical advantage.

We claim:

1. Apparatus for receiving and processing in an aircraft the critical features of an electromagnetic pulse released by a nuclear detonation within flashblindness range, comprising:

first, second and third linearly polarized antenna means adapted to be orthogonally positioned respectively along the longitudinal, vertical and lateral axes of the aircraft for sensing the orthogonal components of the pulse and producing signals indicative thereof;

first, second and third post amplifier means operatively connected respectively to said antennas for receiving the signals produced thereby and for delaying the signals;

first, second and third bipolar logarithmic amplifier means operatively connected respectively to said post amplifiers for receiving the signals delayed thereby and for logarithmically compressing the signals;

threshold circuit means operatively connected to said second post amplifier for receiving the undelayed signal and for producing a short rise-time enabling signal;

first, second and third transmission gates operatively connected respectively to said logarithmic amplifier means and to said threshold circuit means for transmitting the compressed signals when the enabling signal is received;

first, second and third absolute value circuits operatively connected respectively to said transmission gates for producing unipolar signals of the transmitted signals indicative of the absolute value of the field components, the unipolar signals of said first and third circuits being positive and the unipolar signal of said second circuit being negative;

first summing amplifier means operatively connected to said first and second absolute value circuits for producing a signal of the unipolar signals indicative of the field polarization in the plane formed by the longitudinal and vertical axes of the aircraft;

second summing amplifier means operatively connected to said second and third absolute value circuits for producing a signal of the unipolar signals indicative of the field polarization in the plane formed by the vertical and lateral axes of the aircraft;

first and second derivative amplifier means operatively connected respectively to said first and second summing amplifier means for producing signals of the polarization signals indicative of the rate of change of the field polarization;

sensor means responsive to the aircraft attitude for producing signals indicative of roll, yaw and pitch; and recorder means operatively connected to said first, second and third logarithmic amplifier means, said first and second summing amplifier means, said first and second derivative amplifier means, said threshold circuit means, and said sensor means for recording their respective output signals;

whereby the orthogonal components of an electromagnetic pulse, the polarization thereof, the fluctuations in polarization thereof, and aircraft attitude, is correlated with respect to time.

2. Apparatus according to claim 1 wherein each of said post amplifier means comprises:

a first shunt feedback doublet for receiving the antenna signal;

delay line means operatively connected to said first doublet for delaying the signal therefrom; and a second shunt feedback doublet operatively connected to said delay line means for producing the delayed signal at the output of said post amplifier means.

3. Apparatus according to claim 2 wherein said threshold circuit means comprises:

a buffer amplifier operatively connected to said first shunt feedback doublet of said second post amplifier means for receiving the undelayed signal therefrom;

first trigger means operatively connected to said buffer amplifier for transmitting a trigger signal when the undelayed signal attains a predetermined negative level;

second trigger means operatively connected to said buffer amplifier for transmitting a trigger signal when the undelayed signal attains a predetermined positive level;

OR gate means operatively connected to said first and second trigger means for transmitting either of said trigger signals; and blocking oscillator means operatively connected to said OR gate for producing a short rise-time signal at the output of said threshold circuit means in response to the signal transmitted by said OR gate.

4. Apparatus according to claim 1 wherein each of said absolute value circuits comprises:

an ideal diode amplifier for receiving the gate means transmitted signal;

first and second oppositely poled ideal diodes operatively connected respectively at their anode and cathode to the respective one of said ideal diode amplifiers; and differential amplifier means operatively connected at the two inputs to the respective cathode and anode of said first and second diodes and producing an absolute value signal at the output thereof.

5. Apparatus for receiving and processing an electromagnetic radiation signal, comprising:

a plurality of orthogonal linearly polarized antennas for receiving the radiation signal;

delay means for delaying the signal received by each of said antennas;

bipolar logarithmic amplifier means for compressing the delay signals;

absolute value circuits for producing unipolar signals of the compressed signals;

summing amplifier means for combining selected ones of the unipolar signals; and recorder means for recording the compressed and combined signals;

whereby the orthogonal components of the electromagnetic radiation, and the polarization thereof is correlated with respect to time.

6. Apparatus according to claim 5 further comprising:

threshold circuit means for detecting a minimum signal strength from one of said antennas and for generating a short rise-time enabling signal; and transmission gate means for transmitting the compressed signals when the enabling signal is generated.

7. Apparatus according to claim 6 further comprising:

derivative amplifier means for differentiating with respect to time the combined signals.

8. Apparatus according to claim 7 wherein said recorder means further comprises:

means for recording the combined and differentiated signals with respect to time.

9. Apparatus according to claim 8 further comprising:

sensor means for producing signals indicative of the attitude of said antennas.

10. Apparatus according to claim 9 wherein said recorder means further comprises:

means for recording the attitude signal with respect to time.

References Cited

UNITED STATES PATENTS 2,955,778  10/1960  Beveridge.

RODNEY D. BENNETT, Jr., Primary Examiner

T. H. TUBBESING, Assistant Examiner